May 13, 1941.    E. H. McCLELLAND ET AL    2,241,609

CLAMPING DEVICE

Filed April 13, 1939

Inventor
EDWARD H. McCLELLAND
JOHN A. McCLELLAND

By Adrian Medert

Attorney

Patented May 13, 1941

2,241,609

UNITED STATES PATENT OFFICE 2,241,609

CLAMPING DEVICE

Edward H. McClelland and John A. McClelland, Cleveland, Ohio, assignors to Anna McClelland, Cleveland, Ohio Application April 13, 1939, Serial No. 267,724

4 Claims. (Cl. 85—5)

This invention relates to a clamping device and more particularly to a device for aligning and temporarily securing together structural metal plates preparatory to their permanent joining by rivets and/or welding.

Heretofore, it has been the practice in preparing metal plates or structural members to be secured together by rivets or welding, to first align the openings in the plates or members by inserting drift pins through certain of the openings, then to tightly bolt the plates or members together by means of ordinary service bolts. It is customary in practice to have a man on one side of the work to insert the bolts through the holes and to hold the heads thereof while the nuts are applied to the opposite ends by a man on the opposite side of the work. When a sufficient number of rivets have been assembled to secure the structural members together, the temporary service bolts are removed and rivets substituted therefor. The principal objection to the foregoing practice is the amount of labor involved in preparing a job for riveting with the resulting cost thereof.

By the present invention there is provided a clamping device which has all of the functional advantages of drift pins and service bolts for aligning and temporarily securing metal plates together, preparatory to riveting, without any of their attendant disadvantages. The device of the present invention entirely eliminates the use of drift pins and serves to align the openings in adjacent or engaging plates as well as to temporarily clamp them together. The device is simple in operation and conducive to economical use for it can be readily inserted and removed from one side of the work by a single operator. Through the use of our invention a substantial reduction in the cost of preparing a job for riveting and/or welding can be effected.

Other objects of the invention, not at this time more particularly enumerated, will become more apparent as the nature of the invention is better understood from the following detailed description taken in conjunction with the accompanying drawing, wherein.

Figure 1:
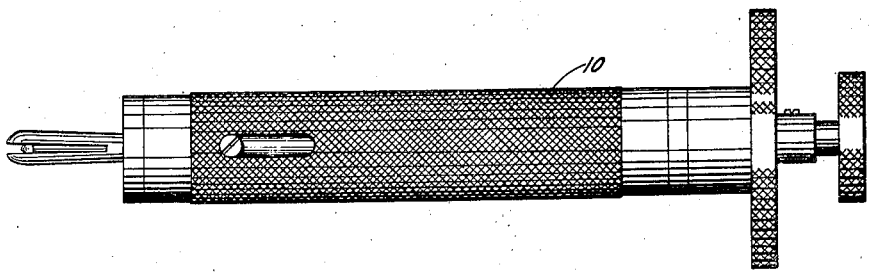
Figure 1 is an elevational view of a preferred embodiment of the invention.
Figure 2:
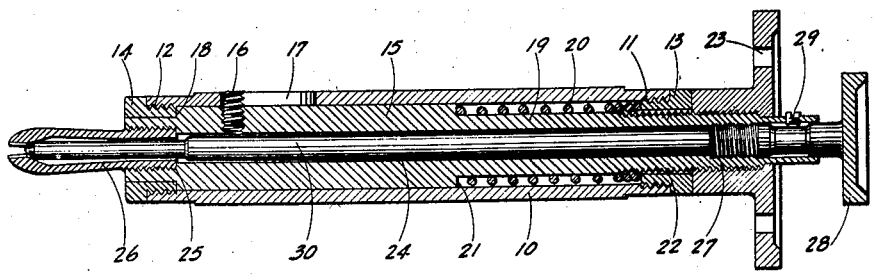
Figure 2 is a longitudinal sectional view taken on Figure 1.

With reference to the figures on the drawing, which there is illustrated a preferred form of the invention, the numeral 10 designates a tubular shell internally threaded adjacent to each end thereof as at 11 and 12 to receive threaded sleeves 13 and 14, respectively. Slidably mounted within the shell 10 for longitudinal movement relative thereto is a cylindrical member 15. A pin 16 extending through a slot 17 in the shell 10 and threaded into the member 15 serves to confine the longitudinal movement of the member 15 within the shell 10 to the length of the slot 17. For simplicity and ease in describing the device, the end of the tool in which the sleeve 14 is threaded, hereinafter will be called the forward or work engaging end.

The cylindrical member 15 has its forward end cut away to form an annular shoulder 18 which normally seats against the inner end of the sleeve 14. The rearward end of the member 15 is formed with a portion 19 of reduced diameter, the free end of which portion extends outwardly through the sleeve 13. Disposed in the cylindrical space formed by the portion 19 and the inner surface of the shell 10 is a compression spring 20 which serves to urge the member 15 toward the forward end of the shell 10. One end of the spring engages the shoulder 21 and the other the inner end face of the sleeve 13. The outwardly extending end of the portion 19 is threaded as at 22 to receive an adjusting screw 23.

The member 15 is provided with a longitudinally extending axial bore 24 having an enlarged end 25 into which is threaded a hollow clamping member 26. The opposite end of the bore 24 is threaded as at 27 to receive a positioning screw 28, removal of which is controlled by the set screw 29. Disposed within the bore 24 is a pin 30, one end of which abuts the end of the shank of the adjusting screw 28 and the other end is tapered and extends into the clamping member 26.

Figures 3, 4:
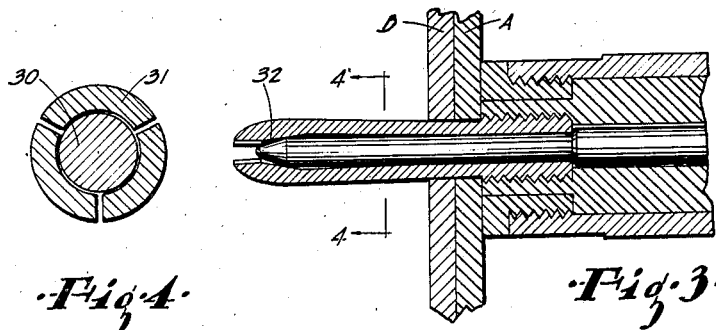
Figure 3 is an enlarged fragmentary sectional view illustrating the work engaging end of the device.
Figure 4 is an enlarged sectional view taken on the line 4—4 of Figure 3.

The clamping member 26, which is illustrated in enlarged detail in Figure 3 is a substantially cylindrical shaped member, having the free end thereof separated or split into a plurality of sections 31. The bore extending through the clamping member is formed with a frusto-conical inner surface 32 complemental to the end surface of the pin 30.

In using the device of the present invention for temporarily clamping together structural members preparatory to riveting and/or welding, the end of the member 26 is inserted through openings in, for example, two engaging plates A and B (Figure 3). The adjusting screw 28 is rotated until the end of the pin 30 is driven into the end of the member 26. The conical surface of the end of the pin 30 moving along the complemental surface 32 of the bore spreads the ends of the sections 31, and forms an expanded end with a tapered surface on the end of the member 26. The adjusting screw 23 is then rotated and the members 15 and 26 are gradually withdrawn into the shell 10, until the inclined or tapered surface of the member 26 causes the plates A and B to be clamped against the end of the sleeve 14. The plates A and B are securely held together by the device during the subsequent operation of riveting and/or welding. To release the tool from the openings it is only necessary to rotate the adjusting screw 28 part of a turn which releases the pressure behind the pin 30 and permits the ends of the section 31 to spring back to their normal position. The clamping device can then be readily removed from the openings and a rivet substantial therefor.

Although the foregoing device has been described somewhat in detail, it is to be understood that various re-arrangements and modifications of parts may be resorted to without departing from the scope or spirit of the invention as herein claimed.

We claim:

1. A device for temporarily securing perforated structural members together comprising a shell having a member engaging end portion, a clamping member extending outwardly from said shell for engaging aligned openings in said structural members and having the free end thereof split into a plurality of sections, an elongated pin extending through said shell for spreading apart the free end of said clamping member, and means including a threaded connection between the clamping member and shell for effecting relative movement of said clamping member relative to said shell whereby said structural members are clamped between said end portion of the shell and the free end of said clamping member.

2. A device for temporarily securing perforated structural members together comprising a shell having a member engaging end portion, a clamping member extending outwardly from said shell for engaging aligned openings in said structural members and having the free end thereof split into a plurality of sections, a pin extending through said clamping member for spreading apart the sections of the free end thereof, means including a threaded connection between the clamping member and shell for withdrawing the clamping member into said shell and clamping the members between the free end of the clamping member and the end portion of the shell, and means for releasing said pin to effect the ready removal of the clamping member from said aligned openings.

3. A device for temporarily securing perforated structural members together comprising a shell having a work engaging end portion, a member disposed within said shell having the free end thereof split into a plurality of sections and extending outwardly beyond the end portion of said shell, means for spreading apart the said sections, and means including a threaded connection between the clamping member and shell for moving said member longitudinally within said shell and withdrawing into said shell the free end of said member.

4. A device for temporarily securing perforated structural members together comprising a shell having a work engaging end portion, a member mounted for longitudinal movement within said shell, a clamping member having the free end thereof split into a plurality of sections secured to said member, said free end adapted to extend through aligned openings in said structural members, a pin extending through said member for spreading apart the free end of said clamping member, and means including a threaded connection between the clamping member and shell for moving said member and withdrawing said clamping member into said shell whereby said structural members are clamped between said end portion of the shell and the free end of said clamping member.

EDWARD H. McCLELLAND.
JOHN A. McCLELLAND.